US011613072B2

(12) United States Patent
Heinz et al.

(10) Patent No.: US 11,613,072 B2
(45) Date of Patent: *Mar. 28, 2023

(54) DUAL-CURING ISOCYANURATE POLYMERS

(71) Applicant: Covestro Deutschland AG, Leverkusen (DE)

(72) Inventors: Paul Heinz, Leverkusen (DE); Richard Meisenheimer, Cologne (DE); Jörg Tillack, Solingen (DE); Dirk Achten, Leverkusen (DE); Thomas Büsgen, Leverkusen (DE); Michael Ludewig, Odenthal (DE); Christoph Tomczyk, Leverkusen (DE); Roland Wagner, Leverkusen (DE); Alisa Kayser, Düsseldorf (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/349,358

(22) PCT Filed: Nov. 14, 2017

(86) PCT No.: PCT/EP2017/079209
§ 371 (c)(1),
(2) Date: May 13, 2019

(87) PCT Pub. No.: WO2018/087396
PCT Pub. Date: May 17, 2018

(65) Prior Publication Data
US 2019/0367665 A1 Dec. 5, 2019

(30) Foreign Application Priority Data
Nov. 14, 2016 (EP) .................................. 16198688

(51) Int. Cl.
| C08G 18/79 | (2006.01) |
| B29C 64/124 | (2017.01) |
| C08G 18/22 | (2006.01) |
| C08G 18/72 | (2006.01) |
| C08G 18/04 | (2006.01) |
| C08G 18/62 | (2006.01) |
| C08G 18/02 | (2006.01) |
| C08G 18/73 | (2006.01) |
| C08G 18/67 | (2006.01) |
| B29C 64/209 | (2017.01) |
| B29C 64/129 | (2017.01) |
| C08G 18/24 | (2006.01) |
| C09D 175/14 | (2006.01) |
| C08J 3/24 | (2006.01) |
| C09J 5/00 | (2006.01) |
| C09J 175/14 | (2006.01) |
| B29C 39/00 | (2006.01) |
| C08G 18/18 | (2006.01) |
| B33Y 10/00 | (2015.01) |
| B33Y 70/00 | (2020.01) |
| C08G 18/10 | (2006.01) |
| C08G 18/81 | (2006.01) |
| C08K 7/14 | (2006.01) |
| B29K 75/00 | (2006.01) |

(52) U.S. Cl.
CPC .......... *B29C 64/124* (2017.08); *B29C 39/006* (2013.01); *B29C 64/129* (2017.08); *B29C 64/209* (2017.08); *B33Y 10/00* (2014.12); *B33Y 70/00* (2014.12); *C08G 18/022* (2013.01); *C08G 18/04* (2013.01); *C08G 18/10* (2013.01); *C08G 18/1816* (2013.01); *C08G 18/225* (2013.01); *C08G 18/246* (2013.01); *C08G 18/6229* (2013.01); *C08G 18/672* (2013.01); *C08G 18/6755* (2013.01); *C08G 18/728* (2013.01); *C08G 18/73* (2013.01); *C08G 18/792* (2013.01); *C08G 18/8175* (2013.01); *C08J 3/244* (2013.01); *C09D 175/14* (2013.01); *C09J 5/00* (2013.01); *C09J 175/14* (2013.01); *B29K 2075/00* (2013.01); *C08K 7/14* (2013.01); *C09J 2475/00* (2013.01)

(58) Field of Classification Search
CPC .. C08G 18/791; C08G 18/792; C08G 18/672; C08G 18/6755; C08G 18/73
See application file for complete search history.

(56) References Cited

U.S. PATENT DOCUMENTS

| 3,487,080 A | 12/1969 | Matsui et al. |
| 3,996,223 A | 12/1976 | Gupta et al. |
| 4,040,992 A | 8/1977 | Bechara et al. |

(Continued)

FOREIGN PATENT DOCUMENTS

| CA | 2034622 A1 | 8/1991 |
| CA | 2139535 A1 | 8/1995 |

(Continued)

OTHER PUBLICATIONS

U.S. Appl. No. 16/349,373.
U.S. Appl. No. 16/349,322.
EP-13196508.9, Covestro Deutschland AG.
PCT/EP2017/073276, Covestro Deutschland AG.

(Continued)

Primary Examiner — Michael L Leonard
(74) Attorney, Agent, or Firm — The Webb Law Firm

(57) ABSTRACT

The present invention relates to polymerizable compositions which contain components that can be crosslinked both via isocyanurate bonds and by a radical reaction mechanism. The invention further relates to methods by way of which polymers can be produced from said compositions.

5 Claims, No Drawings

(56) References Cited

U.S. PATENT DOCUMENTS

| | | | |
|---|---|---|---|
| 4,128,537 A | 12/1978 | Markiewitz | |
| 4,255,569 A | 3/1981 | Müller et al. | |
| 4,288,586 A | 9/1981 | Bock et al. | |
| 4,296,215 A | 10/1981 | Markiewitz | |
| 4,324,879 A | 4/1982 | Bock et al. | |
| 4,379,905 A | 4/1983 | Stemmler et al. | |
| 4,419,513 A | 12/1983 | Breidenbach et al. | |
| 4,487,928 A | 12/1984 | Richter et al. | |
| 4,499,253 A | 2/1985 | Kerimis et al. | |
| 4,604,418 A | 8/1986 | Shindo et al. | |
| 4,789,705 A | 12/1988 | Kase et al. | |
| 4,837,359 A | 6/1989 | Woynar et al. | |
| 4,960,848 A | 10/1990 | Scholl et al. | |
| 4,994,541 A | 2/1991 | Dell et al. | |
| 5,013,838 A | 5/1991 | Scholl | |
| 5,064,960 A | 11/1991 | Pedain et al. | |
| 5,076,958 A | 12/1991 | Pedain et al. | |
| 5,250,608 A * | 10/1993 | Orton | C08G 18/672 525/278 |
| 5,489,663 A | 2/1996 | Brandt et al. | |
| 5,596,021 A * | 1/1997 | Adembri | C08F 283/01 521/108 |
| 5,914,383 A | 6/1999 | Richter et al. | |
| 6,090,939 A | 7/2000 | Richter et al. | |
| 6,133,397 A | 10/2000 | O'Connor et al. | |
| 6,613,863 B2 | 9/2003 | Kohlstruk et al. | |
| 6,635,761 B1 | 10/2003 | Revelant et al. | |
| 7,943,682 B2 * | 5/2011 | Wagner | C08G 18/792 522/174 |
| 8,119,799 B2 | 2/2012 | Binder et al. | |
| 9,926,402 B2 | 3/2018 | Laas et al. | |
| 2012/0029144 A1 * | 2/2012 | Elizalde | C08G 18/6229 524/589 |

FOREIGN PATENT DOCUMENTS

| | | | |
|---|---|---|---|
| CA | 2244486 A1 | 2/1999 | |
| DE | 1954093 A1 | 6/1970 | |
| DE | 1670666 A1 | 7/1971 | |
| DE | 1667309 A1 | 9/1972 | |
| DE | 2414413 A1 | 10/1975 | |
| DE | 2452532 A1 | 5/1976 | |
| DE | 2631733 A1 | 2/1977 | |
| DE | 2641380 A1 | 3/1978 | |
| DE | 3219608 A1 | 9/1983 | |
| DE | 3240613 A1 | 5/1984 | |
| DE | 3700209 A1 | 7/1988 | |
| DE | 3900053 A1 | 7/1990 | |
| DE | 3928503 A1 | 3/1991 | |
| EP | 0000659 A1 * | 2/1979 | C08F 120/36 |
| EP | 0003765 A1 | 9/1979 | |
| EP | 0010589 A1 | 5/1980 | |
| EP | 0013880 A1 | 8/1980 | |
| EP | 0033581 A1 | 8/1981 | |
| EP | 0047452 A1 | 3/1982 | |
| EP | 0056158 A1 | 7/1982 | |
| EP | 0056159 A1 | 7/1982 | |
| EP | 0100129 A1 | 2/1984 | |
| EP | 0102482 A2 | 3/1984 | |
| EP | 0336205 A2 | 10/1989 | |
| EP | 0339396 A1 | 11/1989 | |
| EP | 0379914 A2 | 8/1990 | |
| EP | 0443167 A1 | 8/1991 | |
| EP | 0668271 A1 | 8/1995 | |
| EP | 0671426 A1 | 9/1995 | |
| EP | 0798299 A1 | 10/1997 | |
| EP | 0896009 A1 | 2/1999 | |
| EP | 0962455 A1 | 12/1999 | |
| EP | 1229016 A2 | 8/2002 | |
| EP | 1599526 A1 | 11/2005 | |
| EP | 2883895 A1 | 6/2015 | |
| EP | 2993195 A1 * | 3/2016 | C08G 18/022 |
| GB | 809809 A | 3/1959 | |
| GB | 1145952 A | 3/1969 | |
| GB | 1244416 A | 9/1971 | |
| GB | 1386399 A | 3/1975 | |
| GB | 1391066 A | 4/1975 | |
| GB | 2221465 A | 2/1990 | |
| GB | 2222161 A | 2/1990 | |
| WO | WO-99023128 A1 | 5/1999 | |
| WO | WO-2004078820 A1 | 9/2004 | |
| WO | WO-2005087828 A1 | 9/2005 | |
| WO | WO-2013167404 A1 | 11/2013 | |
| WO | WO-2015155195 A1 | 10/2015 | |
| WO | WO-2016087366 A1 | 6/2016 | |
| WO | WO-2016170057 A1 | 10/2016 | |
| WO | WO-2016170059 A1 | 10/2016 | |
| WO | WO-2016170061 A1 | 10/2016 | |
| WO | WO-2018054776 A1 | 3/2018 | |

OTHER PUBLICATIONS

International Search Report for PCT/EP2017/079208 dated Feb. 14, 2018.
International Search Report for PCT/EP2017/079209 dated Feb. 13, 2018.
International Search Report for PCT/EP2017/079218 dated Feb. 23, 2018.
Written Opinion of the International Searching Authority for PCT/EP2017/079208 dated Feb. 14, 2018.
Written Opinion of the International Searching Authority for PCT/EP2017/079209 dated Feb. 13, 2018.
Written Opinion of the International Searching Authority for PCT/EP2017/079218 dated Feb. 23, 2018.

* cited by examiner

DUAL-CURING ISOCYANURATE POLYMERS

CROSS-REFERENCE TO RELATED APPLICATIONS

This application is a national stage application (under 35 U.S.C. § 371) of PCT/EP2017/079209, filed Nov. 14, 2017, which claims benefit of European Application No. 16198688.0, filed Nov. 14, 2016, both of which are incorporated herein by reference in their entirety.

The present invention relates to polymerizable compositions comprising components which can be crosslinked either via isocyanurate bonds or by a free-radical reaction mechanism. It further describes processes by which polymers can be prepared from these compositions.

WO 2015/155195 describes a composite material obtainable from a reinforcing material and a polyurethane composition consisting of at least one polyisocyanate (PIC), a PIC-reactive component consisting of at least one polyol and at least one methacrylate having OH groups, and a free-radical initiator. The addition reaction between PIC and OH groups takes place simultaneously with the free-radically initiated chain polymerization of the methacrylates. A disadvantage of the process used, in addition to the short pot lives/gel times of the polyurethane compositions, is the fact that, in the preparation of polyurethanes, the mixing ratio of the components, especially of the polyisocyanate and the polyol, is limited by the necessity of keeping the molar ratio of isocyanate and isocyanate-reactive groups close to 1:1.

WO 2016/087366 describes a free-radically polymerizable composition consisting of a polyurethane containing double bonds and a reactive diluent based on various methacrylates.

A disadvantage here is the two-stage reaction regime since a polyurethane first has to be prepared proceeding from an isocyanate and a polyol, and has to be significantly diluted. The subsequent crosslinking is effected exclusively via a free-radical polymerization in a separate step.

WO 2016/170057, WO 2016/170059 and WO 2016/170061 describe the production of polyisocyanurate plastics by polyaddition of oligomeric isocyanates. The effect of the use of oligomeric isocyanates in place of monomeric isocyanates is that less heat of reaction arises in the polymerization and hence rapid polymerization is possible without overheating of the reaction mixture. This is important particularly in the production of shaped bodies since the heat that arises within the shaped body can be removed here via the surface only to a limited degree.

The low-monomer polyisocyanate compositions described as reactants in these applications have the disadvantage of a relatively high viscosity which can be a hindrance in some applications The addition of monomeric polyisocyanates as reactive diluents is undesirable owing to the above-described problem of the heat of reaction. Moreover, monomeric polyisocyanates are volatile and should therefore not be used if at all possible for reasons of occupational hygiene. Alternatively, conventional organic solvents can be used to reduce the viscosity. However, these are disadvantageous for reasons of environmental protection since they are released into the environment during or after the polymerization. Moreover, the use of solvents in the production of shaped bodies can lead to material defects, for example to formation of cavities, since the volume of the evaporating solvent is missing in the material.

A first object of the present invention was that of providing a reaction system with a dual curing mechanism in which the mixing ratio of the reactants is adjustable within a distinctly wider range than in the case of the known radiation-crosslinkable polyurethane systems.

It was also desirable to find a reaction system for the production of polyisocyanurate plastics in which the viscosity of the polyisocyanate can be lowered even without the use of high proportions of monomeric polyisocyanates or organic solvents. In the ideal case, additions of this kind were to be entirely dispensable.

These objects are achieved by the embodiments of the invention disclosed in the claims and in the description below.

In a first embodiment, the present invention relates to a polymerizable composition having a ratio of isocyanate groups to isocyanate-reactive groups of at least 2.0:1.0, comprising:
a) an isocyanate component A;
b) at least one trimerization catalyst C; and
c) at least one component selected from the group consisting of components B, D and E, where
component B has at least one ethylenic double bond but no isocyanate-reactive group;
component D has at least one isocyanate-reactive group and at least one ethylenic double bond in one molecule; and
component E has both at least one isocyanate group and at least one ethylenic double bond in one molecule.

The isocyanate component A enables the formation of a polymer that forms through the addition of isocyanate groups. This forms isocyanurate groups in particular. The crosslinking of the isocyanate groups present in the isocyanate component A endows the polymer with the majority of its mechanical and chemical stability. The crosslinking of the isocyanate groups is mediated by the trimerization catalyst C.

Components B, D and E are each characterized by the presence of an ethylenic double bond. This double bond is a prerequisite for a second crosslinking mechanism to be available in addition to the polyaddition of the isocyanate groups in the polymerizable composition. The use of these individual components or particular combinations of components has specific advantages here:

Component B lowers the viscosity of the polymerizable composition. It can thus advantageously serve as a reactive diluent, meaning that it becomes part of the polymer on conclusion of the polymerization process. It can also serve for the rapid buildup of viscosity if a free-radical polymerization of the ethylenic double bonds is first initiated, preferably by actinic radiation or initiation by means of a thermally activatable initiator, and the crosslinking of the isocyanate groups is conducted only thereafter.

If there is just a component B present in the polymerizable composition without components D or E, the two different crosslinking mechanisms give rise to two different polymer networks. This can lead to turbidity in the finished product and under some circumstances to poorer mechanical properties.

If this is to be avoided, component B is used in combination with a component D or E. It can also be used in combination with both components. Components D and E mediate the crosslinking of the network, formed by free-radical polymerization, of component B with the polymer of isocyanate component A formed through polyaddition of the isocyanate groups. They thus ensure that there are no two separate polymer networks of components A and B present in the polymer, but rather a single polymer network.

Components D and F can be used for formation of a polymer network via free-radical polymerization even without the addition of a component B. In this way, the complete curing of the polymerizable composition of the invention can be effected in two different process steps separated in time. For example, in the polymerizable composition the free-radical crosslinking of the in components D and E can firstly build up viscosity that already imparts a certain degree of dimensional stability to the product being formed, but without making further processing impossible, for example by bending, pressing or embossing. It is only the subsequent crosslinking of the isocyanate groups with one another that leads to complete curing that endows the product with its ultimate stability. What is formed here is a uniform polymer network since components B and D always also react with the isocyanate groups of isocyanate component A.

In a preferred embodiment of the present invention, the polymerizable composition contains at least one of the two components D and E, but no component B.

In another preferred embodiment, the composition of the invention contains a component B and at least one of the two components D and E. Particular preference is given to the combination of B and D.

In a preferred embodiment, the polymerizable composition of the invention comprises isocyanate component A and component B preferably in a quantitative ratio that lowers the viscosity of the undiluted isocyanate component to at most 75%, more preferably at most 50%, even more preferably at most 33%, of the viscosity of undiluted isocyanate component A. The presence of at least one of components D and E is preferred in this embodiment, but not obligatory.

In a preferred embodiment, the quantitative ratio of component A to the total amount of components B, D and E is such that the polymerizable composition has a viscosity of at most 100 000 mPas, more preferably of at most 10 000 mPas, even more preferably of at most 5000 mPas and most preferably at most 2000 mPas.

The above conditions are fulfilled especially when the mass ratio of components A and B is in the range from 95:5 to 30:70, preferably 95:5 to 50:50 and more preferably 92.5:7.5 to 70:30.

The molar ratio of isocyanate groups and ethylenic double bonds is preferably within a range from 1:10 to 10:1, more preferably 1:5 to 8:1 and even more preferably 1:3 to 5:1. The molecular ratio of these functional groups can be determined by the integration of the signals of a sample in the $^{13}$C NMR spectrum.

The polymer obtainable by polymerizing the polymerizable composition of the invention receives its advantageous properties very substantially through crosslinking of the isocyanate groups with one another. Consequently, it is essential to the invention that the ratio of isocyanate groups to the total amount of the isocyanate-reactive groups in the polymerizable composition is restricted such that there is a distinct molar excess of isocyanate groups. The molar ratio of isocyanate groups of the isocyanate component to isocyanate-reactive groups in the polymerizable composition is consequently at least 2.0:1.0, preferably at least 3.0:1.0, more preferably at least 4.0:1.0 and even more preferably at least 8,0:1.0. "Isocyanate-reactive groups" in the context of the present application are hydroxyl, thiol, carboxyl and amino groups, amides, urethanes, acid anhydrides and epoxides. The isocyanate groups present in the polymerizable composition are present in components A and—if present—

E. The isocyanate-reactive groups may in principle be present in all other components except for component B.

By comparison with the polyurethane resins known from WO 2015/155195 with additional radiative curing, the use of the polymerizable composition of the invention enables to a greater flexibility in the selection of the proportions of the individual components. If a polyurethane or a polyurea is to be obtained, the molar ratio of isocyanate groups to isocyanate-reactive groups must if possible be close to 1:1, According to the present invention, however, there is a distinct excess of isocyanate groups that is consequently not just acceptable but actually desired because the polymer formed owes its advantageous properties very substantially to the reaction of isocyanate groups with other isocyanate groups. The structures thus formed, especially the isocyanurate groups, lead to polymers with exceptional hardness and exceptional stability to chemicals. Isocyanurate groups also have an intrinsic flame-retardant effect, and so the addition of flame retardants otherwise necessary for many applications can be dispensed with.

Isocyanate Component A

"Isocyanate component A" in the context of the invention refers to the isocyanate component in the initial reaction mixture. In other words, this is the sum total of all the compounds in the initial reaction mixture that have isocyanate groups, except for component E. The isocyanate component A is thus used as reactant in the process of the invention. When reference is made here to "isocyanate component A", especially to "providing the isocyanate component A", this means that the isocyanate component A exists and is used as reactant. The isocyanate component A preferably contains at least one polyisocyanate.

The term "polyisocyanate" as used here is a collective term for compounds containing two or more isocyanate groups in the molecule (this is understood by the person skilled in the art to mean free isocyanate groups of the general structure —N=C=O). The simplest and most important representatives of these polyisocyanates are the diisocyanates. These have the general structure O=C=N—R—N=C=O where R typically represents aliphatic, alicyclic and/or aromatic radicals.

Because of the polyfunctionality (≥2 isocyanate groups), it is possible to use polyisocyanates to produce a multitude of polymers (e.g. polyurethanes, polyureas and polyisocyanurates) and low molecular weight compounds (for example those having uretdione, isocyanurate, allophanate, biuret, iminooxadiazinedione and/or oxadiazinetrione structure).

The term "polyisocyanates" in this application refers equally to monomeric and/or oligomeric polyisocyanates. For the understanding of many aspects of the invention, however, it is important to distinguish between monomeric diisocyanates and oligomeric polyisocyanates. Where reference is made in this application to "oligomeric polyisocyanates", this means polyisocyanates formed from at least two monomeric diisocyanate molecules, i.e. compounds that constitute or contain a reaction product formed from at least two monomeric diisocyanate molecules.

The preparation of oligomeric polyisocyanates from monomeric diisocyanates is also referred to here as modification of monomeric diisocyanates. This "modification" as used here means the reaction of monomeric diisocyanates to give oligomeric polyisocyanates having uretdione, isocyanurate, allophanate, biuret, iminooxadiazinedione and/or oxadiazinetrione structure.

For example, hexamethylene diisocyanate (HDI) is a "monomeric diisocyanate" since it contains two isocyanate groups and is not a reaction product of at least two polyisocyanate molecules:

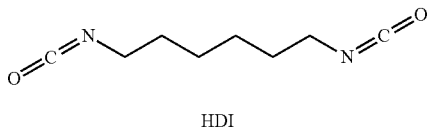 [SMILES: O=C=NCCCCCCN=C=O ; "HDI"]

HDI

Reaction products which are formed from at least two HDI molecules and still have at least two isocyanate groups, by contrast, are "oligomeric polyisocyanates" within the context of the invention. Representatives of such "oligomeric polyisocyanates" are, proceeding from monomeric HDI, for example, HDI isocyanurate and HDI biuret, each of which is formed from three monomeric HDI units:

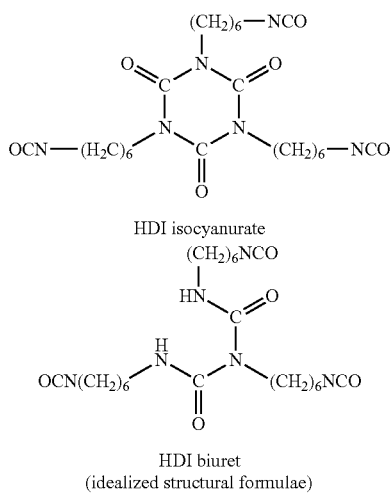

HDI isocyanurate

HDI biuret
(idealized structural formulae)

According to the invention, the proportion by weight of isocyanate groups based on the total amount of the isocyanate component A is at least 15% by weight.

In principle, monomeric and oligomeric polyisocyanates are equally suitable for use in the isocyanate component A of the invention. Consequently, the isocyanate component A may consist essentially of monomeric polyisocyanates or essentially of oligomeric polyisocyanates. It may alternatively comprise oligomeric and monomeric polyisocyanates in any desired mixing ratios.

In a preferred embodiment of the invention, the isocyanate component A used as reactant in the trimerization has a low level of monomers (i.e. a low level of monomeric diisocyanates) and already contains oligomeric polyisocyanates. The expressions "having a low level of monomers" and "having a low level of monomeric diisocyanates" are used here synonymously in relation to the isocyanate component A.

Results of particular practical relevance are established when the isocyanate component A has a proportion of monomeric diisocyanates in the isocyanate component A of not more than 20% by weight, especially not more than 15% by weight or not more than 10% by weight, based in each case on the weight of the isocyanate component A. Preferably, the isocyanate component A has a content of monomeric diisocyanates of not more than 5% by weight, preferably not more than 2.0% by weight, more preferably not more than 1.0% by weight, based in each case on the weight of the isocyanate component A. Particularly good results are established when the isocyanate component A is essentially free of monomeric diisocyanates. "Essentially free" here means that the content of monomeric diisocyanates is not more than 0.5% by weight, based on the weight of the isocyanate component A.

In a particularly preferred embodiment of the invention, the isocyanate component A consists entirely or to an extent of at least 80%, 85%, 90%, 95%, 98%, 99% or 99.5% by weight, based in each case on the weight of the isocyanate component A, of oligomeric polyisocyanates. Preference is given here to a content of oligomeric polyisocyanates of at least 99% by weight. This content of oligomeric polyisocyanates relates to the isocyanate component A as provided. In other words, the oligomeric polyisocyanates are not formed as intermediate during the process of the invention, but are already present in the isocyanate component A used as reactant on commencement of the reaction.

Polyisocyanate compositions which have a low level of monomers or are essentially free of monomeric isocyanates can be obtained by conducting, after the actual modification reaction, in each case, at least one further process step for removal of the unconverted excess monomeric diisocyanates. This removal of monomers can be effected in a particularly practical manner by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In a preferred embodiment of the invention, the isocyanate component A of the invention is obtained by modifying monomeric diisocyanates with subsequent removal of unconverted monomers.

In a particular embodiment of the invention, an isocyanate component A having a low level of monomers, however, contains an extra monomeric diisocyanate. In this context, "extra monomeric diisocyanate" means that it differs from the monomeric diisocyanates which have been used for preparation of the oligomeric polyisocyanates present in the isocyanate component A.

An addition of extra monomeric diisocyanate may be advantageous for achievement of special technical effects, for example an exceptional hardness. Results of particular practical relevance are established when the isocyanate component A has a proportion of extra monomeric diisocyanate in the isocyanate component A of not more than 20% by weight, especially not more than 15% by weight or not more than 10% by weight, based in each case on the weight of the isocyanate component A. Preferably, the isocyanate component A has a content of extra monomeric diisocyanate of not more than 5% by weight, especially not more than 2.0% by weight, more preferably not more than 1.0% by weight, based in each case on the weight of the isocyanate component A.

In a further particular embodiment of the process of the invention, the isocyanate component A contains monomeric monoisocyanates or monomeric isocyanates having an isocyanate functionality greater than two, i.e. having more than two isocyanate groups per molecule. The addition of monomeric monoisocyanates or monomeric isocyanates having an isocyanate functionality greater than two has been found to be advantageous in order to influence the network density of the coating. Results of particular practical relevance are established when the isocyanate component A has a proportion of monomeric monoisocyanates or monomeric isocyanates having an isocyanate functionality greater than two in the isocyanate component A of not more than 20% by weight, especially not more than 15% by weight or not more than 10% by weight, based in each case on the weight of the isocyanate component A. Preferably, the isocyanate component A has a content of monomeric monoisocyanates or monomeric isocyanates having an isocyanate functionality greater than two of not more than 5% by weight, preferably not more than 2.0% by weight, more preferably not more than 1.0% by weight, based in each case on the weight of the isocyanate component A. Preferably, no monomeric monoisocyanate or monomeric isocyanate having an isocyanate functionality greater than two is used in the trimerization reaction of the invention.

The oligomeric polyisocyanates may, in accordance with the invention, especially have uretdione, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

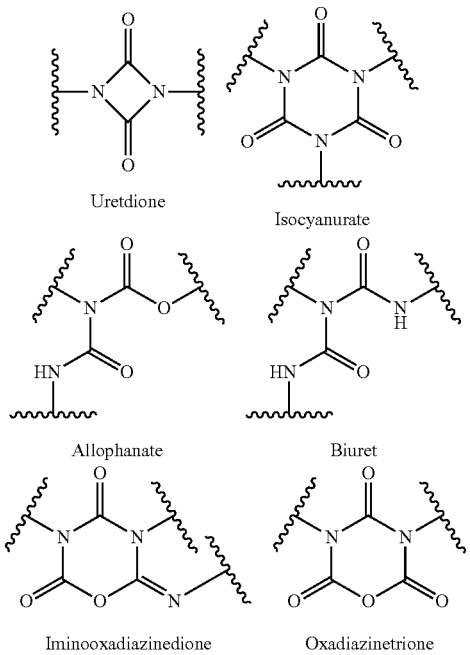

In a preferred embodiment of the invention, an isocyanate component A is used, wherein the isocyanurate structure component is at least 50 mol %, preferably at least 60 mol %, more preferably at least 70 mol %, even more preferably at least 80 mol %, even more preferably still at least 90 mol % and especially preferably at least 95 mol %, based on the sum total of the oligomeric structures from the group consisting of uretdione, isocyanurate, allophanate, biuret, iminooxadiazinedione and oxadiazinetrione structure present in the isocyanate component A, is used.

In a further preferred embodiment of the invention, in the process of the invention, an isocyanate component A containing, as well as the isocyanurate structure, at least one further oligomeric polyisocyanate having uretdione, biuret, allophanate, iminooxadiazinedione and oxadiazinetrione structure and mixtures thereof is used.

The proportions of uretdione, isocyanurate, allophanate, biuret, iminooxadiazinedione and/or oxadiazinetrione structure in the isocyanate component A can be determined, for example, by NMR spectroscopy. It is possible here with preference to use 13C NMR spectroscopy, preferably in proton-decoupled form, since the oligomeric structures mentioned give characteristic signals.

Irrespective of the underlying oligomeric structure (uretdione, isocyanurate, allophanate, biuret, iminooxadiazinedione and/or oxadiazinetrione structure), an oligomeric isocyanate component A for use in the process of the invention and/or the oligomeric polyisocyanates present therein preferably have/has an (average) NCO functionality of 2.0 to 5.0, preferably of 2.3 to 4.5.

Results of particular practical relevance are established when the isocyanate component A to be used in accordance with the invention has a content of isocyanate groups of 8.0% to 28.0% by weight, preferably of 14.0% to 25.0% by weight, based in each case on the weight of the isocyanate component A.

Preparation processes for the oligomeric polyisocyanates having uretdione, isocyanurate, allophanate, biuret, iminooxadiazinedione and/or oxadiazinetrione structure that are to be used in accordance with the invention in the isocyanate component A are described, for example, in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the isocyanate component A of the invention is defined in that it contains oligomeric polyisocyanates which have been obtained from monomeric diisocyanates, irrespective of the nature of the modification reaction used, with observation of an oligomerization level of 5% to 45%, preferably 10% to 40%, more preferably 15% to 30%. "Oligomerization level" is understood here to mean the percentage of isocyanate groups originally present in the starting mixture which are consumed during the preparation process to form uretdione, isocyanurate, allophanate, biuret, iminooxadiazinedione and/or oxadiazinetrione structures.

Suitable polyisocyanates for production of the isocyanate component A for use in the process of the invention and the monomeric and/or oligomeric polyisocyanates present therein are any desired polyisocyanates obtainable in various ways, for example by phosgenation in the liquid or gas phase or by a phosgene-free route, for example by thermal urethane cleavage. Particularly good results are established when the polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates that are likewise suitable can additionally be found, for example, in Justus Liebigs Annalen der Chemie, volume 562 (1949) p. 75-136.

Suitable monomeric monoisocyanates which can optionally be used in the isocyanate component A are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any desired mixtures of such monoisocyanates. An example of a monomeric isocyanate having an isocyanate functionality greater than two which can optionally be added to the isocyanate component A is 4-isocyanatomethyloctane 1,8-diisocyanate (triisocyanatononane; TIN).

In one embodiment of the invention, the isocyanate component A contains not more than 30% by weight, especially not more than 20% by weight, not more than 15% by weight, not more than 10% by weight, not more than 5% by weight or not more than 1% by weight, based in each case on the weight of the isocyanate component A, of aromatic polyisocyanates. As used here, "aromatic polyisocyanate" means a polyisocyanate having at least one aromatically bonded isocyanate group.

Aromatically bonded isocyanate groups are understood to mean isocyanate groups bonded to an aromatic hydrocarbyl radical.

In a preferred embodiment of the process of the invention, an isocyanate component A having exclusively aliphatically and/or cycloaliphatically bonded isocyanate groups is used.

Aliphatically and cycloaliphatically bonded isocyanate groups are understood to mean isocyanate groups bonded, respectively, to an aliphatic and cycloaliphatic hydrocarbyl radical. In another preferred embodiment of the process of the invention, an isocyanate component A consisting of or comprising one or more oligomeric polyisocyanates is used, where the one or more oligomeric polyisocyanates has/have exclusively aliphatically and/or cycloaliphatically bonded isocyanate groups.

In a further embodiment of the invention, the isocyanate component A consists to an extent of at least 70%, 80%, 85%, 90%, 95%, 98% or 99% by weight, based in each case on the weight of the isocyanate component A, of polyisocyanates having exclusively aliphatically and/or cycloaliphatically bonded isocyanate groups. Practical experiments have shown that particularly good results can be achieved with isocyanate component A in which the oligomeric polyisocyanates present therein have exclusively aliphatically and/or cycloaliphatically bonded isocyanate groups.

In a particularly preferred embodiment of the process of the invention, a polyisocyanate composition A is used which consists of or comprises one or more oligomeric polyisocyanates, where the one or more oligomeric polyisocyanates is/are based on 1,4-diisocyanatobutane (BDI), 1,5-diisocyanatopentane (PDI), 1,6-diisocyanatohexane isophorone diisocyanate (IPDI) or 4,4'-diisocyanatodicyclohexylmethane (H12MDI) or mixtures thereof.

In a further embodiment of the invention, in the process of the invention, isocyanate components A having a viscosity greater than 500 mPas and less than 200 000 mPas, preferably greater than 1000 mPas and less than 100 000 mPas, more preferably greater than 1000 mPas and less than 50 000 mPas and even more preferably greater than 1000 mPas and less than 25 000 mPas, measured according to DIN EN ISO 3219 at 21° C., are used.

Component B

Suitable components B are all compounds containing at least one ethylenic double bond. This ethylenic double bond is crosslinkable with other ethylenic double bonds by a free-radical reaction mechanism. This condition is met by preferably activated double bonds between the α carbon atom and the β carbon atom alongside an activating group. The activating group is preferably a carboxyl or carbonyl group. Most preferably, component B is an acrylate, a methacrylate, the ester of an acrylate or the ester of a methacrylate. Preferably, component B does not contain any isocyanate-reactive groups as defined further up in this application or any isocyanate groups either.

Preferred components B are components B1 with one, component B2 with two and component B3 with three of the above-described ethylenic double bonds. Particular preference is given to B1 and/or B2.

In a preferred embodiment, component B used is a mixture of at least one component B1 and at least one component B2.

In a further preferred embodiment, component B used is a mixture of at least one component B1 and at least one component B3.

In yet a further preferred embodiment, component B used is a mixture of at least one component B2 and at least one component B3.

In yet a further preferred embodiment, component B used is a mixture of at least one component B1, at least one component B2 and at least one component B3. Preference is given to using a mixture of at least one component B1 with at least one component B2. The mass ratio of components B1 and B2 here is preferably between 30:1 and 1:30, more preferably between 20:1 and 1:20, even more preferably between 1:10 and 10:1 and most preferably between 2:1 and 1:2.

Preferred components B1 are methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, hexyl (meth)acrylate, heptyl (meth)acrylate, 2-ethylhexyl (meth)acrylate, cyclohexyl (meth)acrylate, octyl (meth)acrylate, isooctyl (meth)acrylate, decyl (meth)acrylate, benzyl (meth)acrylate, tetrahydrofurfuryl (meth)acrylate, octadecyl (meth)acrylate, dodecyl (meth)acrylate, tetradecyl (meth)acrylate, oleyl (meth)acrylate, 4-methylphenyl (meth)acrylate, benzyl (meth)acrylate, furfuryl (meth)acrylate, cetyl (meth)acrylate, 2-phenylethyl (meth)acrylate, isobornyl (meth)acrylate, neopentyl (meth)acrylate, methacrylamide and n-isopropylmethacrylamide.

Preferred components B2 are vinyl (meth)acrylate, tetraethylene glycol di(meth)acrylate, dipropylene glycol di(meth)acrylate, hexane-1,6-diol di(meth)acrylate, neopentyl glycol propoxylate di(meth)acrylate, tripropylene glycol di(meth)acrylate, bisphenol A ethoxylated di (meth)acrylate, ethylene glycol di(meth)acrylate, propylene glycol di(meth) acrylate, neopentyl glycol di(meth)acrylate, hexamethylene glycol di(meth)acrylate, bisphenol A di(meth)acrylate and 4,4'-bis(2-(meth)acryloyloxyethoxy)diphenylpropane.

Preferred components B3 are ethoxylated trimethylolpropane tri(meth)acrylate, propoxylated glycerol tri(meth)acrylate, pentaerythritol tri(meth)acrylate, trimethylolpropane ethoxytri(meth)acrylate, trimethylolpropane tri(meth)acrylate, alkoxylated tri(meth)acrylate and tris(2-(meth)acryloylethyl) isocyanurate.

Trimerization Catalyst C

The trimerization catalyst C may be mixed from one catalyst type or different catalyst types, but contains at least one catalyst that brings about the trimerization of isocyanate groups to isocyanurates or iminooxadiazinediones.

Suitable catalysts for the process of the invention are, for example, simple tertiary amines, for example triethylamine, tributylamine, N,N-dimethylaniline, N-ethylpiperidine or N,N'-dimethylpiperazine. Suitable catalysts are also the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems known from GB 2 222 161 that consist of mixtures of tertiary bicyclic amines, for example DBU, with simple aliphatic alcohols of low molecular weight.

Likewise suitable as trimerization catalysts for the process of the invention are a multitude of different metal compounds. Suitable examples are the octoates and naphthenates of manganese, iron, cobalt, nickel, copper, zinc, zirconium, cerium or lead or mixtures thereof with acetates of lithium, sodium, potassium, calcium or barium that are described as catalysts in DE-A 3 240 613, the sodium and potassium salts of linear or branched alkanecarboxylic acids having up to 10 carbon atoms that are known from DE-A 3 219 608, for example of propionic acid, butyric acid, valeric acid, caproic acid, heptanoic acid, caprylic acid, pelargonic acid, capric acid and undecylenoic acid, the alkali metal or alkaline earth metal salts of aliphatic, cycloaliphatic or aromatic mono- and polycarboxylic acids having 2 to 20 carbon atoms that are known from EP-A 0 100 129, for example sodium or potassium benzoate, the alkali metal phenoxides known from GB-A 1 391 066 and GB-A 1 386 399, for example sodium or potassium phenoxide, the alkali metal and alkaline earth metal oxides, hydroxides, carbonates, alkoxides and phenoxides known from GB 809 809, alkali metal salts of enolizable compounds and metal salts of weak aliphatic or cycloaliphatic carboxylic acids, for example sodium methoxide, sodium acetate, potassium acetate, sodium acetoacetate, lead 2-ethylhexanoate and lead naphthenate, the basic alkali metal compounds complexed with crown ethers or polyether alcohols that are known from EP-A 0 056 158 and EP-A 0 056 159, for example complexed sodium or potassium carboxylates, the pyrrolidinone-potassium salt known from EP-A 0 033 581, the mono- or polynuclear complex of titanium, zirconium and/or hafnium known from application EP 13196508.9, for example zirconium tetra-n-butoxide, zirconium tetra-2-ethylhexanoate and zirconium tetra-2-ethylhexoxide, and tin compounds of the type described in European Polymer Journal, vol. 16, 147-148 (1979), for example dibutyltin dichloride, diphenyltin dichloride, triphenylstannanol, tributyltin acetate, tributyltin oxide, tin dioctoate, dibutyl(dimethoxy)stannane and tributyltin imidazolate.

Further trimerization catalysts suitable for the process of the invention are, for example, the quaternary ammonium hydroxides known from DE-A 1 667 309, EP-A 0 013 880 and EP-A 0 047 452, for example tetraethylammonium hydroxide, trimethylbenzylammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water with 1,4-diazabicyclo[2.2.2]octane), the quaternary hydroxyalkylammonium hydroxides known from EP-A 37 65 or EP-A 10 589, for example N,N,N-trimethyl-N-(2-hydroxyethyl)ammonium hydroxide, the trialkylhydroxylalkylammonium carboxylates that are known from DE-A 2631733, EP-A 0 671 426, EP-A 1 599 526 and US 4,789,705, for example N,N,N-trimethyl-N-2-hydroxypropylammonium p-tert-butylbenzoate and N,N,N-trimethyl-N-2-hydroxypropylammonium 2-ethylhexanoate, the quaternary benzylammonium carboxylates known from EP-A 1 229 016, such as N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl)ammonium 2-ethylhexanoate or N,N,N-tributyl-N-(4-methoxybenzyl) ammonium pivalate, the tetrasubstituted ammonium α-hydroxycarboxylates known from WO 2005/087828, for example tetramethylammonium lactate, the quaternary ammonium or phosphonium fluorides known from EP-A 0 339 396, EP-A 0 379 914 and EP-A 0 443 167, for example N-methyl-N,N,N-trialkylammonium fluorides with C8-C10-alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride, the quaternary ammonium and phosphonium polyfluorides known from EP-A 0 798 299, EP-A 0 896 009 and EP-A 0 962 455, for example benzyltrimethylammonium hydrogen polyfluoride, the tetraalkylammonium aikylcarbonates which are known from EP-A 0 668 271 and are obtainable by reaction of tertiary amines with dialkyl carbonates, or betaine-structured quaternary ammonioalkyl carbonates, the quaternary ammonium hydrogencarbonates known from WO 1999/023128, such as choline bicarbonate, the quaternary ammonium salts which are known from EP 0 102 482 and are obtainable from tertiary amines and alkylating esters of phosphorus acids, examples of such salts being reaction products of triethylamine, DABCO or N-methylmorpholine with dimethyl methanephosphonate, or the tetrasubstituted ammonium salts of lactams that are known from WO 2013/167404, for example trioctylammonium caprolactamate or dodecyltrimethylammonium caprolactamate.

Further trimerization catalysts C suitable for the process of the invention can be found, for example, in J. H. Saunders and K. C. Frisch, Polyurethanes Chemistry and Technology, p. 94 ff. (1962) and the literature cited therein.

Particular preference is given to carboxylates and phenoxides with metal or ammonium ions as counterion. Suitable carboxylates are the anions of all aliphatic or cycloaliphatic carboxylic acids, preferably those with mono- or polycarboxylic acids having 1 to 20 carbon atoms. Suitable metal ions are derived from alkali metals or alkaline earth metals, manganese, iron, cobalt, nickel, copper, zinc, zirconium, cerium, tin, titanium, hafnium or lead. Preferred alkali metals are lithium, sodium and potassium, more preferably sodium and potassium. Preferred alkaline earth metals are magnesium, calcium, strontium and barium.

Very particular preference is given to the octoate and naphthenate catalysts described in DE-A 3 240 613, these being octoates and naphthenates of manganese, iron, cobalt, nickel, copper, zinc, zirconium, cerium or lead, or mixtures thereof with acetates of lithium, sodium, potassium, calcium or barium.

Very particular preference is likewise given to sodium benzoate or potassium benzoate, to the alkali metal phenoxides known from GB-A 1 391 066 and GB-A 1 386 399, for example sodium phenoxide or potassium phenoxide, and to the alkali metal and alkaline earth metal oxides, hydroxides, carbonates, alkoxides and phenoxides that are known from GB 809 809.

The trimerization catalyst C preferably contains a polyether. This is especially preferred when the catalyst contains metal ions. Preferred polyethers are selected from the group consisting of crown ethers, diethylene glycol, polyethylene glycols and polypropylene glycols. It has been found to be of particular practical relevance in the process of the invention to use a trimerization catalyst B containing, as polyether, a polyethylene glycol or a crown ether, more preferably 18-crown-6 or 15-crown-5. Preferably, the trimerization catalyst B comprises a polyethylene glycol having a number-average molecular weight of 100 to 1000 g/mol, preferably 300 g/mol to 500 g/mol and especially 350 g/mol to 450 g/mol. Very particular preference is given to the combination of the above-described carboxylates and phenoxides of alkali metals or alkaline earth metals with a polyether.

Component D

Component D is a compound having at least one isocyanate-reactive group as defined further up in this application and at least one ethylenic double bond in one molecule. The isocyanate-reactive group of component D may also be a uretdione group. Ethylenic double bonds are preferably those that are crosslinkable with other ethylenic double bonds by a free-radical reaction mechanism. Corresponding activated double bonds are defined in detail further up in this application for component B.

Preferred components D are alkoxyalkyl (meth)acrylates having 2 to 12 carbon atoms in the hydroxyalkyl radical. Particular preference is given to 2-hydroxyethyl acrylate, the isomer mixture formed on addition of propylene oxide onto acrylic acid, or 4-hydroxybutyl acrylate.

Component E

Component E is a compound having both at least one isocyanate group and at least one ethylenic double bond in one molecule. It can advantageously be obtained by crosslinking a component D described in the preceding paragraph with a monomeric or oligomeric polyisocyanate as described further up in this application. This crosslinking is effected by reaction of the isocyanate-reactive groups, in this case especially a hydroxyl, amino or thiol group, and an isocyanate group of the polyisocyanate. This is preferably catalyzed by a component G as disclosed further down in this application. But any other suitable catalyst known to those skilled in the art is also conceivable. It is also possible to dispense with a catalyst entirely.

Particular preference is given to combinations in which a hexamethylene diisocyanate- or pentamethylene diisocyanate-based oligomeric polyisocyanate is combined with a component D selected from the group consisting of 2-hydroxyethyl acrylate, the isomer mixture formed on addition of propylene oxide onto acrylic acid, and 4-hydroxybutyl acrylate.

Further preferred components E are 2-isocyanatoethyl (meth)acrylate, tris(2-hydroxyethyl) isocyanate tri(meth) acrylate, vinyl isocyanates, allyl isocyanates and 3-isopropenyl-α,α-dimethylbenzyl isocyanate.

Component F

In principle, free-radical polymerization of the ethylenically unsaturated compounds present in the reaction mixture can be brought about by actinic radiation with a sufficient energy content. This is especially UV-VIS radiation in the wavelength range between 200 and 500 nm. In this case, the polymerizable composition of the invention need not contain any component F.

But if the use of corresponding radiation is to be dispensed with, the presence of at least one component F suitable as an initiator for a free-radical polymerization of the ethylenic double bonds present in the polymerizable composition of the invention is required. The effect of initiators of this kind is that they form, under suitable conditions, especially when heated or under the action of suitable radiation, free radicals that react with the ethylenic double bonds, forming vinyl radicals which in turn react with further ethylenic double bonds in a chain reaction, Component F comprises at least one radiation-activated initiator F1 or at least one heat-activated initiator F2. But it may also comprise a mixture of at least one radiation-activated initiator F1 and at least one heat-activated initiator F2.

Preferred radiation-activated initiators F1 are compounds of the unimolecular type (I) and of the bimolecular type (II). Suitable type (I) systems are aromatic ketone compounds, for example benzophenones in combination with tertiary amines, alkylbenzophenones, 4,4'-bis(dimethylamino)benzophenone (Michler's ketone), anthrone and halogenated benzophenones or mixtures of the recited types. Also suitable are type (II) initiators such as benzoin and derivatives thereof, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones. Specific examples are Irgacure® 500 (a mixture of benzophenone and 1-hydroxycyclohexyl phenyl ketone, from Ciba, Lampertheim, DE), Irgacure® 819 DW (phenylbis(2,4,6-trimethylbenzoyl)phosphine oxide, from Ciba, Lampertheim, DE) or Esacure® KIP EM (oligo-[2-hydroxy-2-methyl-1-[4-(1-methylvinyl)phenyl]propanones], from Lamberti, Aldizzate, Italy) and bis(4-methoxybenzoyl)diethylgermanium. Mixtures of these compounds may also be employed.

It should be ensured that the photoinitiators have a sufficient reactivity toward the radiation source used. A multitude of photoinitiators is known on the market. Commercially available photoinitiators cover the wavelength range of the entire UV-VIS spectrum.

Preferred heat-activated initiators F2 are organic azo compounds, organic peroxides and C-C-cleaving initiators, such as benzpinacol silyl ether, N,N-diacylhydroxylamines, O-alkylated N,N-diacylhydroxylamines or O-acylated N,N-diacylhydroxylamines. Likewise suitable are inorganic peroxides such as peroxodisulfates. Further suitable thermal free-radical initiators are azobisisobutyronitrile (AIBN), dibenzoyl peroxide (DBPO), di-tert-butyl peroxide, dicumyl peroxide (DCP) and tent-butyl peroxybenzoate. But the person skilled in the art is also able to use all other familiar thermal initiators.

Component G

Component G is a catalyst that catalyzes the crosslinking of an isocyanate group with an isocyanate-reactive group. This preferably gives rise to a urethane group, a thiourethane group or a urea group.

The polymerizable composition preferably contains a component G when a component D having at least one isocyanate-reactive group is present. However, the use of a component G is not obligatory in this case either, since the crosslinking of isocyanate groups with isocyanate-reactive groups can also be accelerated by the trimerization catalysts C used and also proceeds at sufficient speed even entirely without catalysis when the reaction temperature is high enough. It is possible to dispense with the addition of a component G especially when the crosslinking of the isocyanate groups present in the isocyanate component A is conducted at a temperature of at least 60° C., preferably at least 120° C.

Preferred components G are the typical urethanization catalysts as specified, for example, in Becker/Braun, Kunststoffhandbuch [Plastics Handbook] volume 7, Polyurethane [Polyurethanes], section 3,4, The catalyst used may especially be a compound selected from the group of the tertiary amines, tertiary amine salts, metal salts and metal organyls, preferably from the group of the tin salts, tin organyls and bismuth organyls.

Component H

According to the invention, the viscosity of the polymerizable composition is preferably adjusted by the use of a component B in suitable concentration. These act as reactive diluents and basically make it possible to dispense with the use of additional solvents to lower the viscosity of the isocyanate component A.

In particular embodiments, however, it may be desirable to additionally add a solvent suitable for isocyanates to the polymerizable composition of the invention. This may be desirable, for example, when the proportion of component B in the polymerizable composition is to be limited and the aim is a lowering of viscosity unachievable with this limited proportion of component B. In this case, the polymerizable composition of the invention may contain all solvents suitable for the dilution of isocyanates that are known to the person skilled in the art. These are preferably hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxyprop-2-yl acetate, 3-methoxy-n-butyl acetate, propylene glycol diacetate, acetone, methyl ethyl ketone, methyl isobutyl ketone, cyclohexanone, lactones such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulfoxide, triethyl phosphate or any desired mixtures of such solvents.

Component I

In a preferred embodiment, the polymerizable composition of the invention additionally comprises at least one additive I selected from the group consisting of UV stabilizers, antioxidants, mold release agents, water scavengers, slip additives, defoamers, leveling agents, rheology additives, flame retardants and pigments. These auxiliaries and additives are typically present in an amount of not more than 10% by weight, preferably not more than 5% by weight and more preferably not more than 3% by weight, based on the polymerizable composition of the invention.

Component J

In a particularly preferred embodiment of the present invention, the polymerizable composition comprises at least one organic filler J1 and/or at least one inorganic filler J2. Said fillers may be present in any shape and size known to the person skilled in the art.

Preferred organic fillers J1 are wood, pulp, paper, paperboard, fabric slivers, cork, wheat chaff, polydextrose, cellulose, aramids, polyethylene, carbon, carbon nanotubes, polyester, nylon, Plexiglass, flax, hemp and also sisal.

Preferred inorganic fillers J2 are $AlOH_3$, $CaCO3$, silicon dioxide, magnesium carbonate, $TiO_2$, ZnS, minerals containing silicates, sulfates, carbonates and the like, such as magnesite, baryte, mica, dolomite, kaolin, talc, clay minerals, and carbon black, graphite, boron nitride, glass, basalt, boron, ceramic and silica.

Use

In a further embodiment, the present invention relates to the use of at least one component selected from the group consisting of components B, D and E for production of a polymerizable composition having a ratio of isocyanate groups to isocyanate-reactive groups of at least 2.0:1.0, which contains an isocyanate component A and is polymerizable either by free-radical polymerization or by crosslinking of isocyanate groups with one another.

Preferably, at least one component B as defined above in this application is additionally used.

All definitions given further up in this application for the polymerizable composition A are also applicable to this embodiment. This is especially true of the quantitative ratios of components A, B, D and E and the ratio of isocyanate groups to the total amount of the isocyanate-reactive groups in the polymerizable composition.

Process

In a further embodiment, the present invention relates to a process for preparing a polymer, comprising the steps of
a) providing a polymerizable composition as described further up in this application;
b) crosslinking the ethylenic double bonds present in said polymerizable composition; and
c) crosslinking the isocyanate groups present in said polymerizable composition;
wherein process steps b) and c) are conducted simultaneously or in any desired sequence.

In a preferred embodiment of the present invention, viscosity is first built up by process step b) before the ultimate curing of the polymer in process step c). In this case, the two process steps need not follow directly on from one another in time. It is especially preferable that, between the two process steps, there is a further operating step in which the product of process step b) is shaped.

All other definitions given above with regard to the polymerizable composition of the invention are also applicable to the process of the invention, unless stated otherwise hereinafter.

If process steps b) and c) are not to be conducted simultaneously, it is preferable that the polymerizable composition of the invention does not contain any heat-activated initiator F2. Conversely, it is advantageous that, in the case of simultaneous performance of process steps b) and c), a heat-activated initiator F2 is used since, in this case, the increase in temperature required for the crosslinking of the isocyanate groups in process step c) also brings about the crosslinking of the ethylenic double bonds in process step b).

When the polymerizable composition contains at least one component D, it is preferable that the process of the invention includes a further reaction step d) in which the isocyanate-reactive group of component D is crosslinked with an isocyanate group of the isocyanate component A or of a reaction product of the isocyanate component A. Said process step d) can be conducted before process step b), it can be conducted between process steps b) and c), or it can be conducted in parallel to process step b) or c) or else after process steps b) and c).

Since the crosslinking of an isocyanate group of component A and an isocyanate-reactive group of component D also proceeds solely or entirely without the assistance of a catalyst by virtue of the trimerization catalyst C, process step d) preferably proceeds in parallel to process step c) since there is already an increase in temperature therein that also brings about the reaction of components A and D.

Crosslinking of the Ethylenic Double Bonds

The ethylenic double bonds present in the polymerizable composition of the invention are crosslinked by a free-radical polymerization. If a radiation-activated initiator F1 is present, this polymerization reaction is initiated in accordance with the invention by the use of radiation suitable for activation thereof. If a heat-activated initiator F2 is present in the polymerizable composition used, the crosslinking of the ethylenic double bonds is initiated by heating the polymerizable composition to the temperature required. In principle, however—irrespective of the presence of initiators F1 or F2—the use of sufficiently high-energy radiation as defined further up in this application is also sufficient to initiate the free-radical polymerization in process step b).

Crosslinking of the Isocyanate Groups

The "crosslinking" of the isocyanate component A in process step c) is a process in which the isocyanate groups present therein react with one another or with urethane groups already present to form at least one structure selected from the group consisting of uretdione, isocyanurate, allophanate, biuret, iminooxadiazinedione and oxadiazinetrione structures. In this reaction, the isocyanate groups originally present in the isocyanate component A are consumed. The formation of the aforementioned groups results in combination of the monomeric and oligomeric polyisocyanates present in the isocyanate composition A to form a polymer network.

Since there is a distinct molar excess of isocyanate groups over isocyanate-reactive groups in the polymerizable composition of the invention, the result of the crosslinking reaction is that at most 20%, preferably at most 10%, more preferably at most 5%, even more preferably at most 2% and especially at most 1% of the total nitrogen content of the isocyanate component A is present in urethane and/or allophanate groups.

In a particularly preferred embodiment of the invention, the cured isocyanate component A, however, is not entirely free of urethane and allophanate groups. Consequently, taking account of the upper limits defined in the preceding paragraph, it preferably contains at least 0.1% urethane and/or allophanate groups based on the total nitrogen content.

It is preferable that the crosslinking of the isocyanate groups present in the polymerizable composition of the invention proceeds predominantly via cyclotrimerization of at least 50%, preferably at least 60%, more preferably at least 70%, especially at least 80% and most preferably 90% of the free isocyanate groups present in the isocyanate component A to give isocyanurate structural units. Thus, in the finished material, corresponding proportions of the nitrogen originally present in the isocyanate component A are bound within isocyanurate structures. However, side reactions, especially those to give uretdione, allophanate and/or iminooxadiazinedione structures, typically occur and can even be used in a controlled manner in order to advantageously affect, for example, the glass transition temperature (Tg) of the polyisocyanurate plastic obtained. However, the above-defined content of urethane and/or allophanate groups is preferably present in this embodiment too.

The crosslinking of the isocyanate groups is preferably effected at temperatures between 50° C. and 220° C., more preferably between 80° C. and 200° C. and even more preferably between 100° C. and 200° C.

The abovementioned temperatures are maintained in process step c) until at least 50%, preferably at least 75% and even more preferably at least 90% the free isocyanate groups present in the isocyanate component A at the start of process step b) have been consumed. The percentage of isocyanate groups still present can be determined by a comparison of the content of isocyanate groups in % by weight in the isocyanate component A present at the start of process step b) with the content of isocyanate groups in % by weight in the reaction product, for example by the aforementioned comparison of the intensity of the isocyanate band at about 2270 cm-1 by means of IR spectroscopy.

The exact duration of process step c) naturally depends on the geometry of the workpiece to be created, especially the ratio of surface area and volume, since the required temperature has to be attained for the minimum time required even in the core of the workpiece being formed. The person skilled in the art is able to determine these parameters by simple preliminary tests.

In principle, crosslinking of the above mentioned proportions of free isocyanate groups is achieved when the abovementioned temperatures are maintained for 1 minute to 4 hours. Particular preference is given to a duration between 1 minute and 15 minutes at temperatures between 180° C. and 220° C. or a duration of 5 minutes to 120 minutes at a temperature of 120° C.

Polymer

In yet a further embodiment, the present invention relates to a polymer obtainable by the process described above.

The polymer is preferably in the form of a coating or a shaped body.

A "coating" is preferably characterized in that it is applied to a substrate. This substrate is preferably selected from the group consisting of wood, plastic, metal, natural stone, concrete, paper and glass. In this respect, the present invention also relates to a substrate coated with the polymer of the invention. The coating is more preferably characterized in that it has a dimension of at least 0.005 mm and at most 5 mm in one dimension and a dimension of at least 2 cm, preferably at least 3 cm, in at least one, preferably both, of the two other dimensions.

A "shaped body" is defined in that it has an edge length of at least 0.5 mm, preferably at least 1 mm, in at least one of the three dimensions, and a dimension of at least 2 cm, preferably at least 5 cm, in at least one of the two other dimensions. It preferably has an edge length of at least 2 cm in all three dimensions.

The examples which follow serve only to illustrate the invention. They are not intended to limit the scope of protection of the patent claims in any manner.

EXAMPLES

General Details:

All percentages, unless stated otherwise, are based on percent by weight (% by weight).

The ambient temperature of 23° C. at the time of conduct of the experiments is referred to as RT (room temperature).

The methods detailed hereinafter for determination of the appropriate parameters were employed for conduction and evaluation of the examples and are also the methods for determination of the parameters of relevance in accordance with the invention in general.

Determination of Phase Transitions by DSC

The phase transitions were determined by means of DSC (differential scanning calorimetry) with a Mettler DSC 12E (Mettler Toledo GmbH, Giessen, Germany) in accordance with DIN EN 61006. Calibration was effected via the melt onset temperature of indium and lead. 10 mg of substance were weighed out in standard capsules. The measurement was effected by three heating runs from −50° C. to +200° C. at a heating rate of 20 K/min with subsequent cooling at a cooling rate of 320 K/min, Cooling was effected by means of liquid nitrogen. The purge gas used was nitrogen. The values reported are each based on the evaluation of the 2nd heating curve. The glass transition temperature $T_g$ was obtained from the temperature at half the height of a glass transition step.

Determination of Infrared Spectra

The infrared spectra were measured on a Bruker FT-IR spectrometer equipped with an ATR unit.

Starting Compounds

Polyisocyanate A1: HDI trimer (NCO functionality >3) with an NCO content of 23.0% by weight from Covestro AG. The viscosity is about 1200 mPa·s at 23° C. (DIN EN ISO 3219/A.3).

Polyisocyanate A2: PDI trimer (NCO functionality >3) with an NCO content of 21.5% by weight from Covestro AG. The viscosity is about 9500 mPa·s at 23° C. (DIN EN ISO 3219/A.3).

Acrylate 1: hexanediol diacrylate (HDDA) was sourced with a purity of >99% by weight from Sigma-Aldrich.

Acrylate 2: hydroxypropyl methacrylate (HPMA) was sourced with a purity of 98% by weight from abcr GmbH.

Acrylate 3: isobornyl methacrylate (IBOMA) was sourced with a purity of >99% by weight from Sigma-Aldrich.

Initiator I1: Trigonox® C. (cert-butyl peroxybenzoate) was sourced with a purity of >98% by weight from Akzo Nobel.

Potassium acetate was sourced with a purity of >99% by weight from ACROS.

Lucirin TPO-L is an ethyl (2,4,6-trimethylbenzoyl)phenylphosphinate from BASF, sourced from Sigma Aldrich.

Polyethylene glycol (PEG) 400 was sourced with a purity of >99% by weight from ACROS.

All raw materials except for the catalyst were degassed under reduced pressure prior to use, and the polyethylene glycol was additionally dried over 0.5 nm molecular sieve sourced from Merck for >24 h.

Preparation of Catalyst K1:

Potassium acetate (5.0 g) was stirred in the PEG 400 (95.0 g) at RT until all of it had dissolved. In this way, a 5% by weight solution of potassium acetate in PEG 400 was obtained and was used as catalyst without further treatment.

Preparation of the Reaction Mixture

Unless stated otherwise, the reaction mixture was produced by mixing polyisocyanate (A1-A2) and the acrylate(s) with an appropriate amount of catalyst (K1-2), initiator and any additive at 23° C. in a Speedmixer DAC 150.1 FVZ from Hauschild at 2750 min$^{-1}$ and mixing for 2 min. This was then either poured into a suitable mold without further treatment for crosslinking or knife-coated onto a glass plate.

Working Examples 1-20

The amounts of polyisocyanate, acrylate, catalyst solution, initiator and any additive that are specified in table 1 were treated according to the abovementioned production method for reaction mixtures. The curing in the oven was conducted with the times and temperatures likewise listed in table 1.

The $T_g$ of the cured reaction mixtures was 70-128° C. The viscosities of the inventive reaction mixtures comprising polyisocyanate A1 (examples 3, 4, 6-9) directly after the production of the mixture were 0.5-0.7 Pa·s and rose to 1.0-2.1 Pa·s over the course of 4 h at RT. The viscosity of the inventive reaction mixture comprising polyisocyanate A2 (example 11) directly after the production of the mixture was 3.0 Pa·s and rose to 5.6 Pa·s over the course of 4 h at RT.

TABLE 1

Compositions, production conditions and material properties of working examples 1-20.

| | | Resin composition | | | | Catalyst + initiator | | Processing | | | Material properties |
|---|---|---|---|---|---|---|---|---|---|---|---|
| Ex. | Isocyanate | Amount of polyisocyanate [g] | Amount of acrylate 1 [g] | Amount of acrylate 2 [g] | Amount of acrylate 3 [g] | Amount of cat. K[g] | Amount of initiator I[g] | Reaction temperature [° C.] | Reaction time [min] | Pot life at RT | $T_G$ |
| 1 (inv.) | A2 | 20.00 | 2.00 | 2.00 | / | 0.84 | 0.08 | 200 | 4 | n.d. | 124.0° C. |
| 2 (inv.) | A1 | 20.00 | 2.00 | 2.00 | / | 0.84 | 0.08 | 200 | 4 | n.d. | 97.5° C. |
| 3 (inv.) | A1 | 20.00 | / | 2.00 | 2.00 | 0.84 | 0.08 | 200 | 4 | 50 min | 90° C. |
| 4 (inv.) | A1 | 20.00 | 1.33 | 1.33 | 1.33 | 0.84 | 0.08 | 200 | 4 | 56 min | 93.5° C. |
| 5 (inv.) | A1 | 20.00 | 3.80 | 0.19 | / | 0.80 | 0.08 | 200 | 4 | n.d. | 87.0° C. |
| 6 (inv.) | A1 | 20.00 | 1.90 | 0.19 | 1.90 | 0.80 | 0.08 | 200 | 4 | >240 min | 106.0° C. |
| 7 (inv.) | A1 | 20.00 | 3.80 | 0.19 | / | 0.80 | 0.08 | 200 | 10 | >240 min | 102.5° C. |
| 8 (inv.) | A1 | 20.00 | 3.80 | 0.19 | / | 0.80 | 0.08 | 200 | 7 | >240 min | 102.0° C. |
| 9 (inv.) | A1 | 20.00 | 3.80 | 0.19 | / | 0.80 | 0.08 | 220 | 5 | >240 min | 102.0° C. |
| 10 (inv.) | A1 | 20.00 | 1.90 | 0.19 | 1.90 | 0.80 | 0.08 | 200 | 10 | n.d. | 134° C. |
| 11 (inv.) | A2 | 20.00 | 1.90 | 0.19 | 1.90 | 0.80 | 0.08 | 200 | 4 | >240 min | 128.5° C. |
| 12 (inv.) | A1 | 20.00 | / | 2.00 | / | 0.74 | 0.08 | 200 | 3 | n.d. | 87° C. |
| 13 (inv.) | A1 | 20.00 | 2.00 | 2.00 | / | 0.80 | 0.10 | 200 | 4 | n.d. | 86° C. |
| 14 (inv.) | A1 | 20.00 | 2.00 | 2.00 | / | 0.80 | 0.12 | 200 | 4 | n.d. | 90.5° C. |
| 15 (inv.) | A1 | 20.00 | 2.00 | 2.00 | / | 0.80 | 0.14 | 200 | 5 | n.d. | 92° C. |
| 16 (inv.) | A1 | 20.00 | / | 2.00 | / | 0.74 | 0.007 | 200 | 3 | n.d. | 71.5° C. |
| 17 (inv.) | A1 | 20.00 | / | 2.00 | / | 0.74 | 0.02 | 200 | 3 | n.d. | 83.0° C. |
| 18 (inv.) | A1 | 20.00 | / | 2.00 | / | 0.74 | 0.04 | 200 | 3 | n.d. | 82.5° C. |
| 19 (inv.) | A1 | 20.00 | 3.00 | 3.00 | / | 0.84 | 0.12 | 200 | 4 | n.d. | 77.5° C. |
| 20 (inv.) | A1 | 20.00 | 2.00 | 2.00 | 2.00 | 0.84 | 0.12 | 200 | 4 | n.d. | 93.5° C. | n.d.: not determined

Working Examples 21-24

The amounts of polyisocyanate, acrylate, catalyst solution specified in table 2 were treated according to the abovementioned production method for reaction mixtures.

The reaction mixture was knife-coated onto the tin-free side of a glass plate in a thickness of 250 μm and then UV-treated with a gallium-doped mercury lamp and an undoped mercury lamp. Subsequently, the samples were cured at 180° C. for 15 min.

TABLE 2

Compositions and material properties of working examples 21-24.

| | Resin composition | | | | Catalyst + initiator | | Material properties | |
|---|---|---|---|---|---|---|---|---|
| Ex. | Amount of Isocyanate A1 [g] | Amount of acrylate 1 [g] | Amount of acrylate 2 [g] | Mode of cross-linking | Amount of cat. K1 [g] | Amount of Lucirin TPO-L [g] | Appearance after exposure | Appearance after curing |
| 21 | 50.0 | 9.5 | 0.5 | PUR, PIR, PAC | 2.0 | 0.3 | Transparent, rubber-like solid lacquer. No run-off. | Solid, pale yellowish lacquer. Cannot be pulled off. |
| 22 | 50.0 | 7.13 | 0.38 | PUR, PIR, PAC | 2.0 | 0.3 | Transparent, rubber-like solid lacquer. No run-off. | Solid, pale yellowish lacquer. Cannot be pulled off. |
| 23 | 50.0 | 1.19 | 0.06 | PUR, PIR, PAC | 2.0 | 0.3 | Partly dried material, slight run-off apparent after 10 min. | Solid, pale yellowish lacquer. Cannot be pulled off. |
| 24 | 50 | 9.5 | / | PIR, PAC | 2.0 | 0.3 | Partly dried material, slight run-off apparent after 5 min. | Solid, pale yellowish, slightly cloudy lacquer. Cannot be pulled off. |

Comparative Example 25

93.5 g of polyisocyanate A1 and 4.0 g of catalyst solution K1 were treated according to the abovementioned production method for reaction mixtures. The curing in the oven was conducted at 220° C. for 3 min.

The $T_g$ of the cured reaction mixture was 101° C. The viscosity of the comparative reaction mixtures with polyisocyanate A1 directly after the production of the mixture was more than 2 Pa·s and rose to 3.5 Pa·s within 4 h.

By comparison, the starting viscosity in the case of a mixture with acrylate (see inventive examples) was much lower (0.5-0.7 Pa·s) and even after 4 h at RT had lower values (1.0-2.0 Pa·s) than the starting viscosity of the comparative experiment. At the same time, the material properties (e.g. Tg) of the materials made of the inventive examples were also within a comparable order of magnitude.

Comparative Example 26

93.5 g of polyisocyanate A2 and 4.0 g of catalyst solution K1 were treated according to the abovementioned production method for reaction mixtures. The curing in the oven was conducted at 220° C. for 3 min.

The $T_g$ of the cured reaction mixture was 137° C. The viscosity of the comparative reaction mixtures with polyisocyanate A2 directly after the production of the mixture was >10 Pa·s, which distinctly complicates processing.

Comparative Example 27

93.5 g of polyisocyanate A1 and 4.0 g of catalyst solution K1 were treated according to the abovementioned production method for reaction mixtures.

The reaction mixture is applied to the tin-free side of a glass plate in a thickness of 250 μm and then UV-treated with a gallium-doped mercury lamp and an undoped mercury lamp, with no change in the reaction mixture and detectable run-off.

The invention claimed is:

1. A process for preparing a polymer, comprising the steps of a) providing a polymerizable composition having a ratio of isocyanate groups to isocyanate-reactive groups of at least 3.0:1.0, comprising:
   a) an isocyanate component A;
   b) at least one trimerization catalyst C; and
   c) at least one component B and at least one component D and/or E, where component B is an acrylate, a methacrylate, an ester of an acrylate or an ester of a methacrylate;
   component D has at least one isocyanate-reactive group and at least one ethylenic double bond in one molecule; and
   component E has both at least one isocyanate group and at least one ethylenic double bond in one molecule;
   b) crosslinking the ethylenic double bonds present in said polymerizable composition; and
   c) crosslinking the isocyanate groups present in said polymerizable composition; wherein process steps b) and c) are conducted simultaneously or in any desired sequence.

2. The process as claimed in claim 1, wherein the polymerizable composition comprises at least one component E and the process comprises a further process step d) in which the isocyanate-reactive group of component E is crosslinked with an isocyanate group of the isocyanate component A or of a reaction product of the isocyanate component A.

3. The process as claimed in claim 1, wherein process step b) is conducted before process step c) and the polymerizable composition contains a radiation- activated initiator F1.

4. The process as claimed in claim 1, wherein, in process step b), at least 50% of the free isocyanate groups present in isocyanate component A are converted to isocyanurate structural units.

5. The process as claimed in claim 1, wherein process step b) is conducted with actinic radiation of wavelength 200 nm to 500 nm and process step c) is effected at a temperature between 50° C. and 250° C.

\* \* \* \* \*